Patented Nov. 25, 1952

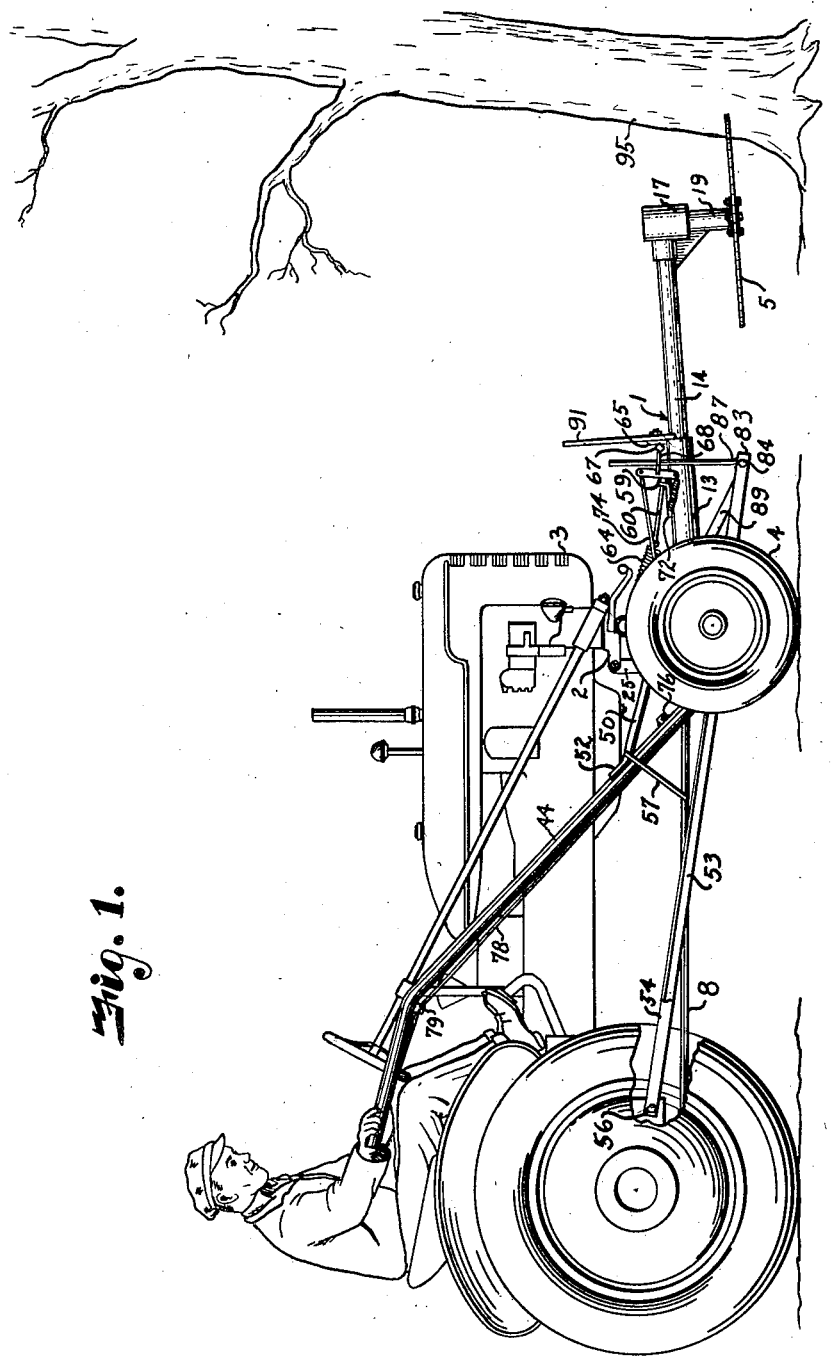

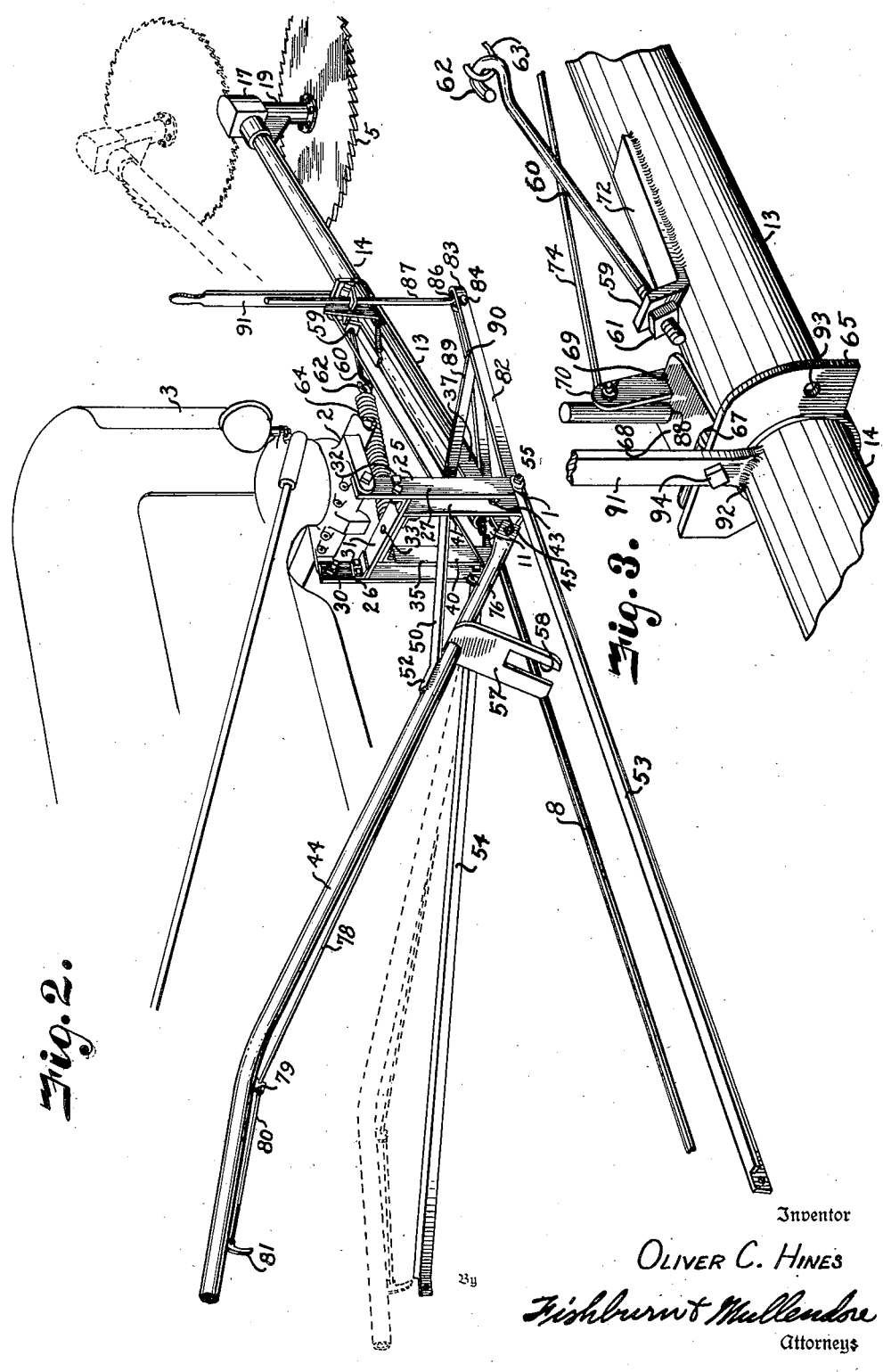

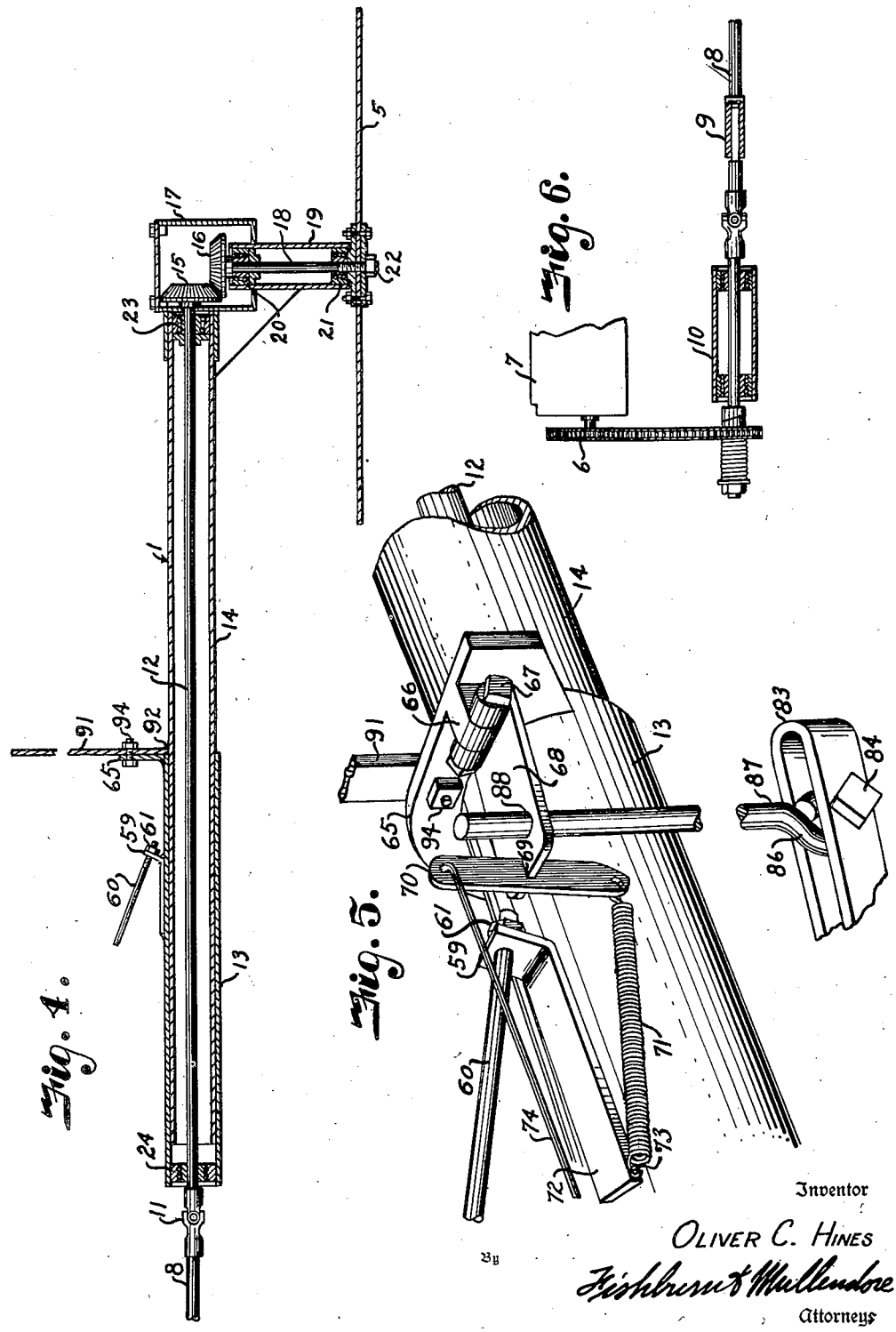

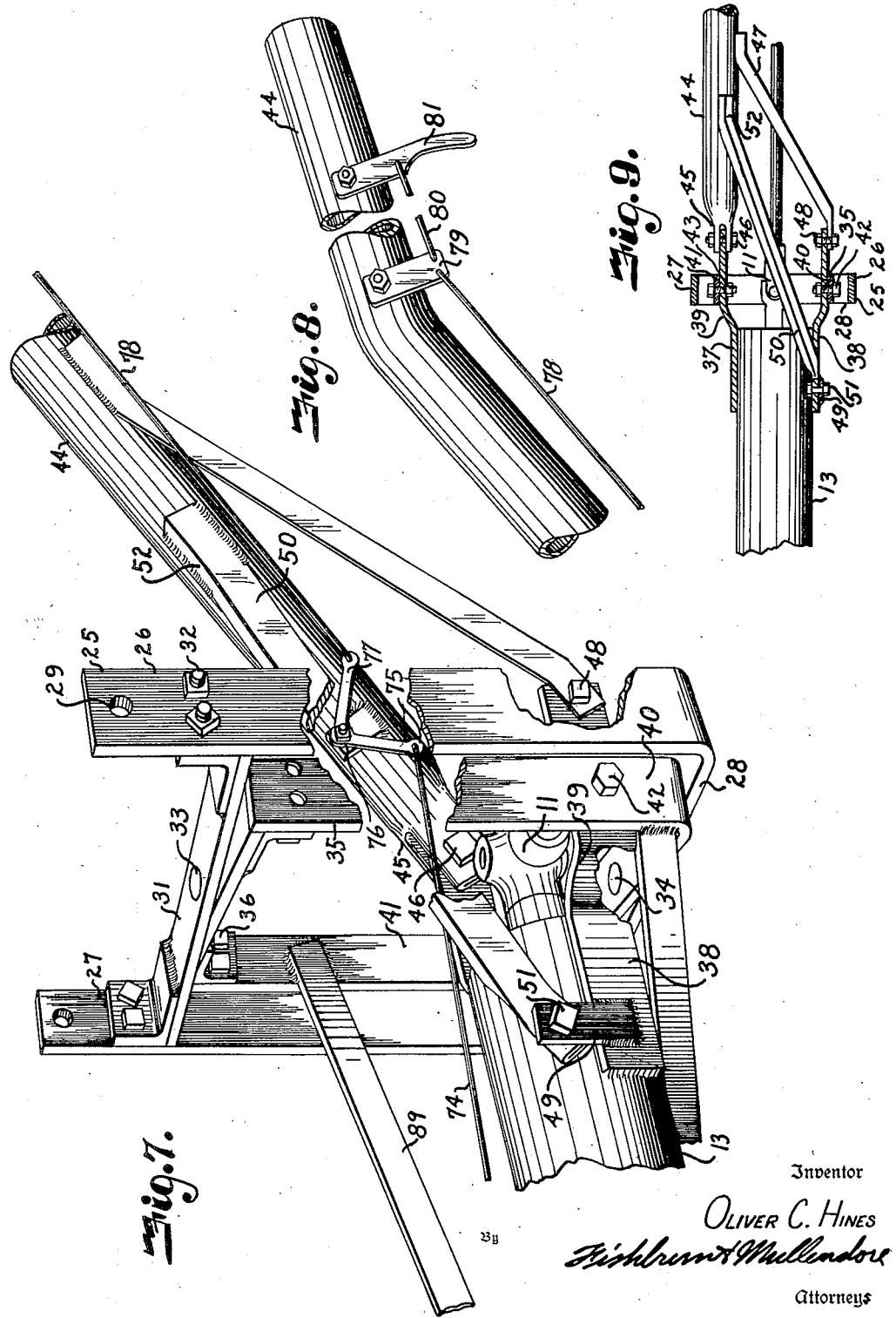

2,619,129

UNITED STATES PATENT OFFICE 2,619,129

PORTABLE TRACTOR SAW

Oliver C. Hines, Kansas City, Kans.

Application January 15, 1949, Serial No. 71,135

4 Claims. (Cl. 143—43)

This invention relates to new and useful improvements in portable saws, and more particularly to attachments for securing the saws to tractors and the like to be operated by the power take-off of such tractors.

The principal object of the present invention is to provide for rotatably and pivotally mounting of the saw operating mechanism to the frame of the tractor so that the saw may be moved in horizontal and vertical positions.

Other objects of the present invention are to provide a frame rigidly mounted to the frame of a tractor or the like at substantially the front thereof at one side of the motor and inside or outside the front wheel, having a sub-frame pivotally mounted in said frame in which the driving mechanism and levers for the saw are rotatably and pivotally mounted; to provide means for driving the saw from the power take-off on the rear of the tractor; to provide stabilizing means for the framework structure; to provide lever mechanism for moving the saw horizontally and vertically by the operator from the seat of the tractor; to provide means for holding the saw in either horizontal or vertical position; to provide detent means for holding the saw in adjusted positions vertically; to provide means on the lever mechanism to prevent lateral movement of the saw mechanism; and to provide a device of this character, simple, economical to manufacture and efficient in operation.

In accomplishing these and other objects of the present invention, I have provided improved details of structure, the preferred forms of which are illustrated in the accompanying drawings, wherein:

Fig. 1 is a side view of my saw attachment shown attached to a tractor and with the saw engaging a tree to be felled.

Fig. 2 is an elevational view of the device shown partly disassembled from the tractor and different positions of the saw and lever mechanism shown in dotted lines.

Fig. 3 is a fragmentary elevational view of the means for changing the saw to different positions.

Fig. 4 is a longitudinal sectional view through the housing and gear driving mechanism of the saw, particularly illustrating the journalled tubings comprising the housing.

Fig. 5 is an elevational view of the detent locking mechanism for holding the saw in adjusted position.

Fig. 6 is a longitudinal sectional view particularly illustrating the slip joint for attaching the device to the power take-off of the tractor.

Fig. 7 is a fragmentary elevational view particularly illustrating the rotatable attachment of the framework structure to the tractor.

Fig. 8 is a fragmentary elevational view particularly illustrating the lever and operating latch.

Fig. 9 is a plan view partly in section illustrating the lever connection to the frame universal joint.

Referring more in detail to the drawings:

1 designates a portable saw embodying the features of my invention adapted to be supported on a frame 2 of a tractor or other vehicle 3. My device may be adapted for other types of vehicles, but is particularly shown in connection with a tractor having the frame 2 set off by the side of the front of the tractor and inside the front wheel 4 of tractor (Fig. 1).

The saw 5 is adapted to be operated from the power take-off at the rear of the tractor as shown by chain and sprocket arrangement 6 connected to the rear housing 7, and a universal drive shaft 8 provided with a slip joint 9 and a bearing member 10 for supporting the drive shaft with respect due to the power take-off. The universal drive shaft extends forwardly underneath the tractor and has universal joint connection 11 with the shaft 12 extending through tubular members 13 and 14, the tube 14 being journalled in the tube 13. The outer end of the shaft 12 is connected to bevel gears 15 and 16 in a housing or head 17 for driving the saw 5 through a vertical shaft 18 extending through a tubular member 19 provided with the usual bearings 20 and 21. The saw 5 is secured on the lower end of the vertical shaft 18 by nut 22. Bearings 23 and 24 are provided in the respective ends of the tubes 12 and 13 for supporting the shaft 12 therein.

Referring specifically to the frame universal joint, 25 designates a frame of substantially U-shape having arms 26 and 27 and connected by a transverse bar 28. The upper ends of the arms 26 and 27 are provided with openings 29 adapted to be secured to the frame 2 of the tractor by bolts or the like 30. Spaced from the upper end of the arms 26 and 27 is a cross bar 31 secured to the arms by bolts 32 thus providing a substantially square shaped opening in the frame 25. The cross members 28 and 31 in the frame are provided with opening at substantially the center thereof and pivoted in the frame by pins or the like 33 and 34 is a subframe 35 also of substantially square shape. The frame 35 is also U-shape and has a bar secured to the upper end thereof by bolts or the like 36.

Rigidly secured to each side of the rear end of the tubular member 13 by welding or the like are arms 37 and 38 curved outwardly slightly as indicated at 39 (Fig. 9). The arms are pivotally secured to the side arms 40 and 41 of the pivoted frame 35 by bolts 42 and 43 for mounting of the universal drive shaft in the frame universal joint. Secured to the free end of the arm 37 is a lever 44, the lever having a yoked end 45 and is rigidly secured to the end of the arm 37 by a bolt 46. Rigidly secured to one side of the lever 44 is a brace arm 47 having its free end rigidly secured to the free end of the arm 38 by a bolt 48 to form a rigid connection between the lever and the pivoted end of the shaft housing.

Rigidly secured to the arm 38 by welding or the like is an upstanding lug 49 and an arm 50 has one end rigidly secured to the lug by a bolt 51 and its opposite end is rigidly secured to the lever 44 by welding or the like as indicated at 52 to rigidly secure the lever to the housing of the universal drive shaft.

Bracing rods 53 and 54 are provided for the frame universal joint, one end of which is attached to such frame by bolts or the like 55 and the rear end secured to the axle housing of the tractor as indicated at 56 (Fig. 1). The lever 44 is elongated and extends rearwardly to within easy reach of the operator of the tractor and by moving the lever from side to side the subframe 35 is rotated within the frame 25 to lead the saw 5 into the work. A stop or lock member 57 is rigidly secured on the lever 44 by welding or the like and extends downwardly therefrom having a groove 58 adapted to engage over the brace rod 53 to prevent lateral movement of the saw when desired. The lock 57 may also engage the drive shaft 8 for the same purpose if desired.

A lug 59 is rigidly secured to the top of the housing 13 having an opening adapted to receive the threaded end of a rod 60 which is held to the lug by nuts 61 the opposite end having a hook 62 adapted to engage the end 63 of a coil spring 64 having its opposite ends secured to the cross arms 31 of the frame structure 25 to lend support to the saw unit extending ahead of the tractor.

The saw may be held in vertical adjusted position and for this purpose I provide a bracket 65 rigidly secured to the forward end of housing 13 by welding or any suitable manner as best illustrated in Fig. 5. The bracket is rounded on one end and extends substantially half way around the housing 13. The bracket is provided with an ear 66 to which is attached by a bolt or the like 67 a plate or detent 68 having a groove 69 in its rear edge and in which is rigidly secured by welding or other suitable means a vertical arm 70. Attached to the lower end of the arm is a coil spring 71 having its opposite ends secured to the rear end of the arm 72 of the lugs 59 as indicated at 73. Attached to the upper end of the arm 70 is a rod or line 74 having its opposite end attached to an arm 75 of a bell crank pivotally attached to an ear 76 rigidly secured to the side of the lever 44 as best illustrated in Fig. 7. Connected to the arm 77 of the bell crank is a rod 78 extending along side the lever 44 and having its opposite end attached to a pivoted lug 79 also to which is attached a rod 80 secured to a finger lever 81 also pivotally mounted on the lever 44 within easy reach of the operator of the vehicle.

Rigidly secured to the lower portions of the vertical arms 40 and 41 of the pivoted frame 35 is a V-shaped brace member 82 looped as indicated at 83 provided with a transverse opening and adapted to receive a bolt or the like 84 for engaging in the eye 86 of a pin 87 adapted to extend upwardly and engage in an opening 88 of the detent 68. A brace 89 having one end rigidly secured to the inside of the arm 41 of the pivoted frame 35 has its opposite ends welded or otherwise suitably secured between the arms of the V-shaped brace member 82 as indicated at 90 (Fig. 2). The mechanism just described provides for holding of the saw to different vertical positions as indicated in dotted lines in Fig. 2 by manipulation of the lever rods attached to the lever 44 through the bell crank arrangement.

In order to adapt the saw blade 5 for operation in a vertical position, for instance when the work is lying in a horizontal position, the housing 14 is rotated within the housing 13 by an upstanding arm or lever 91 rigidly secured to the upper side thereof by welding or the like as indicated at 92. The bracket 65 is provided with a plurality of openings 93 and a pin or bolt 94 is provided for engaging therein to hold the housing 13 and 14 in rigid adjusted position. By removal of the bolt 94 the housing 14 is rotated at 90° so that the saw will assume a vertical position and then the bolt placed in the opening in the bracket 65 aligning with such a position. The change of position of the blade with the mechanism shown is a manual operation.

Operation of a device constructed and assembled as described is as follows:

With the attachment mounted as shown the tractor is driven to a tree as indicated at 95 and the saw adjusted to the desired height by manipulation of the lever rods attached to the lever 44 through the bell crank and rods 74 exerting backward pull on the upper end of the arm 70 to loosen the detent 70 to allow the pin 87 to slide therein upon upward or downward pressure on the lever arm 44. Raising of the lever upwardly will exert upward pressure on the arm 50 on the rear end of the universal housing to lower the saw and a downward pull on the lever will raise the saw in the opposite direction. When the desired height is reached a release of the rod 74 will allow the arm 70 to again exert pressure on the rod 87 through the spring tension 71 to engage the detent on the rod 87 to hold the saw unit in the adjusted position.

When it is desired to move the saw horizontally or laterally to right or left, movement of the lever 44 laterally will accomplish this result through the rotatable mounting of the sub-frame and the universal drive shaft being mounted in the sub-frame 35 so that it will pivot within the frame 25 rigidly secured to the tractor and move the saw into the work.

It will be obvious from the foregoing that I have provided an improved mounting for portable saw in which a frame universal joint is mounted on the frame of a tractor and pivotal mounting of the saw unit in the frame universal joint for movement of the saw in vertical position through manipulation of the lever as well as a change of location of the saw from horizontal to vertical position by manipulation of the lever on the shaft housing.

What I claim and desire to secure by said Letters Patent:

1. In combination with a tractor having a power take-off, a saw attachment comprising, a frame rigidly mounted to the tractor in substantially vertical relation thereto, a subframe rotatably mounted in the first named frame for pivotal movement about a vertical axis, a saw unit including an elongated housing having a shaft extending longitudinally thereof and rotatable therein, a head on the outer end of said housing, a circular saw rotatably carried by said head, the rear end of said housing being pivotally mounted in said subframe for pivotal movement about a horizontal axis, a drive shaft connected to the power-take-off of the tractor, a universal joint connecting the drive shaft with the first named shaft, said universal joint being at the point of intersection of the axes of the pivotal movement of the subframe and housing, means connecting said first named shaft with said saw for driving the same, a lever connected to the rear of said housing and extending upwardly and rearwardly therefrom for operation by the tractor operator in pivoting said housing and subframe for swinging movement of the saw vertically and laterally, a brace member on the subframe and extending forwardly therefrom, a substantially vertically arranged pin pivotally mounted on the forward end of the brace member, and a latch member on the housing and selectively engageable with the pin for retaining the housing and saw in vertically adjusted position.

2. In combination with a tractor having a power take-off, a saw attachment comprising, a frame rigidly mounted to the tractor in substantially vertical relation thereto, a subframe in the first named frame, means pivotally connecting the upper and lower portions of the frame and subframe for pivotal movement of the subframe about a vertical axis, a saw unit including an elongated housing having a shaft extending longitudinally thereof and rotatable therein, said housing including tubular members one journalled within the other, a head on the outer end of said housing, a circular saw rotatably carried by said head, the rear end of said housing being pivotally mounted in said subframe for pivotal movement about a horizontal axis, a drive shaft connected to the power take-off of the tractor, a universal joint connecting the drive shaft with the first named shaft, said universal joint being at the point of intersection of the axes of the pivotal mountings of the subframe and housing, means connecting said first named shaft with said saw for driving the same, a lever connected to the rear of said housing and extending upwardly and rearwardly therefrom for operation by the tractor operator in pivoting said housing and subframe for swinging movement of the saw vertically and laterally, and means for rotating one of said tubes within the other to change the saw from horizontal to vertical position.

3. In combination with a tractor having a power take-off, a saw attachment comprising, a frame rigidly mounted to the tractor in substantially vertical relation thereto, a subframe in the first named frame, means pivotally connecting the upper and lower portions of the frame and subframe for pivotal movement of the subframe about a vertical axis, a saw unit including an elongated housing having a shaft extending longitudinally thereof and rotatable therein, said housing including tubular members one journalled within the other, a head on the outer end of said housing, a circular saw rotatably carried by said head, the rear end of said housing being pivotally mounted in said subframe for pivotal movement about a horizontal axis, a drive shaft connected to the power take-off of the tractor, a universal joint connecting the drive shaft with the first named shaft, said universal joint being at the point of intersection of the axes of the pivotal mountings of the subframe and housing, means connecting said first named shaft with said saw for driving the same, a lever connected to the rear of said housing and extending upwardly and rearwardly therefrom for operation by the tractor operator in manually pivoting said housing and subframe for swinging movement of the saw vertically and laterally, resilient means connnected to the housing and subframe for applying an upward force on the housing, a brace member on the subframe and extending forwardly therefrom, a substantially vertically arranged pin pivotally mounted on the forward end of the brace member, a latch member on the housing and selectively engageable with the pin for retaining the housing and saw in vertically adjusted position, and means for rotating one of said tubes within the other to change the saw from horizontal to vertical position.

4. In combination with a tractor having a power take-off, a saw attachment comprising, a substantially rectangular frame rigidly mounted to the front portion of the frame of the tractor in substantially vertical relation thereto, a substantially rectangular subframe in the first named frame, means pivotally connecting the mid portions of the upper and lower portions of the frame and subframe for pivotal movement of the subframe about a vertical axis, a saw unit including an elongated housing having a shaft extending longitudinally thereof and rotatable therein, said housing including tubular members one journalled within the other, a head on the outer end of said housing, a circular saw rotatably carried by said head, the rear end of said housing being pivotally mounted in said subframe for pivotal movement about a horizontal axis, a drive shaft connected to the power take-off of the tractor, a universal joint connecting the drive shaft with the first named shaft, said universal joint being at the point of intersection of the axes of the pivotal movement of the subframe and housing, means connecting said first named shaft with said saw for driving the same, a lever connected to the rear of said housing and extending upwardly and rearwardly therefrom for operation by the tractor operator in manually pivoting said housing and subframe for swinging movement of the saw vertically and laterally, resilient means connected to the upper portion of the subframe and the housing forwardly of the subframe for applying an upward force on the housing, a brace member on the subframe and extending forwardly therefrom, a substantially vertically arranged pin pivotally mounted on the forward end of the brace member, a latch member on the housing and selectively engageable with the pin for retaining the housing and saw in vertically adjusted position, and means for rotating one of said tubular members within the other to change the saw from horizontal to vertical position, said means including a bracket on the forward end of the rear housing having spaced openings therein and a lever rigidly secured to the rear end of the other housing for rotating said housing to turn said saw and a pin carried by said lever to engage in said openings.

OLIVER C. HINES.

REFERENCES CITED

The following references are of record in the file of this patent:

UNITED STATES PATENTS

| Number | Name | Date |
| --- | --- | --- |
| 1,832,599 | Wilhelm et al. | Nov. 17, 1931 |
| 2,310,152 | Ronning | Feb. 2, 1943 |
| 2,312,287 | Renner | Feb. 23, 1943 |
| 2,365,408 | Hillyer | Dec. 19, 1944 |
| 2,462,314 | Fuqua | Feb. 22, 1949 |